Feb. 28, 1956 R. L. HANSON ET AL 2,736,771

DISTANT-TALKING TELEPHONE SYSTEM

Filed Dec. 6, 1951 2 Sheets-Sheet 1

INVENTORS: R. L. HANSON
W. E. KOCK

BY Harry C. Hart

ATTORNEY

DISTANT-TALKING TELEPHONE SYSTEM

Filed Dec. 6, 1951 2 Sheets-Sheet 2

INVENTORS: R. L. HANSON
W. E. KOCK
BY Harry C. Hart
ATTORNEY

United States Patent Office 2,736,771

Patented Feb. 28, 1956

2,736,771

DISTANT-TALKING TELEPHONE SYSTEM

Robert L. Hanson, Summit, and Winston E. Kock, Basking Ridge, N. J., assignors to Bell Telephone Laboratories, Incorporated, New York, N. Y., a corporation of New York Application December 6, 1951, Serial No. 260,166

6 Claims. (Cl. 179—1)

This invention relates to distant-talking telephone systems and has for its principal object the suppression of ambient noise.

In communication by way of the ordinary telephone handset, the microphone is held close to the mouth of the speaker and the reproducer is held close to his ear. This arrangement greatly favors the speaker's own voice as compared with all other sounds and permits the furnishing of incoming sound signals at low level directly to his ear. It thus avoids a number of difficulties which arise in the case of a distant-talking telephone set in which a microphone is placed on a desk or hung on a wall a few feet away from the speaker while a reproducer is likewise disposed at a distance from his ear. In such an installation, not only does acoustic feedback arise, provided the gain of the system be high enough, but noises of all sorts are picked up by the microphone along with the desired speech and transmitted over the telephone line to the called party. Such "noises" may be due to conversations which may be taking place among other persons in the room with the talker, to an electric fan, to room reverberation of the calling party's speech, and the like. Such noises, which are especially objectionable during pauses in the calling party's speech, may originate at any point in the room and may therefore reach the microphone from any angle; in general they do not reach the microphone with the same incidence angle as does the calling party's speech.

In principle, such off-axis sounds can be suppressed by employment of a microphone having a sharply directional characteristic, but as a practical matter directional variation of sensitivity so great as to exclude off-axis sounds at voice frequencies can be obtained only with a structure of prohibitively large dimensions.

Accordingly it is a particular object of the invention to suppress transmission of "off-axis" sounds; i. e., sounds which reach the microphone from angles other than that along which the desired speech reaches it; and to do so without resort to structures of excessive dimensions.

This object is attained in the following fashion. A pair of microphones are disposed side by side and facing the speaker in his normal position. They may be disposed at a convenient distance from him, e. g., at the back of a desk at which he sits or on a wall behind it. They are spaced apart by a small fraction of a wavelength at ordinary voice frequencies, e. g., one foot or so, in a fashion such that an "axis" which perpendicularly bisects the line joining the microphones passes through the normal position of the speaker's mouth.

After any desired amount of amplification, the outputs of these two microphones are added together, that is averaged, and passed through any desired transmission apparatus to an outgoing telephone line. This apparatus, however, includes means for varying the gain of the transmission path under control of a control signal.

In addition to the summed output of the two microphones, a difference output is also derived, the individual outputs being preferably clipped beforehand. The difference output is applied as a control signal to vary the gain in the summed output transmission path.

With this arrangement, as long as the only sound which reaches the microphone originates at the speaker's mouth, the difference signal has a zero value and the gain in the transmission path remains unchanged. The same is true when a low-level off-axis noise, disturbance, or interruption arises, provided that its sound level at the microphones is less than that of the desired speech. However, when the sound level of the disturbing noise exceeds that of the desired speech the difference signal takes on a non-zero value, the control signal comes into play and the gain in the voice transmission path is depressed. Such a situation arises for example, when the speaker in a reverberant room ceases talking. Room reverberations reach the microphones from all incidence angles and so operate to depress the gain in the transmission path to prevent the transmission of reverberation signals to the called party. Similarly, any off-axis noise which may originate during the silence of the speaker reaches the microphones from an off-axis direction and so operates to depress the gain of the transmission path in a fashion to prevent transmission of the noise.

For the return conversation the installation may be provided with a sound reproducer which is likewise mounted at a distance from the calling party's ear. It is preferably mounted facing the calling party's head and on an extension of the line joining the two microphones. Thus the sound of the reproducer, while fully audible by the user, reaches the microphones from a direction at 90 degrees from the axis and so generates a difference signal having a maximum value. It thus depresses the gain of the transmission circuit in the fashion to prevent return over the telephone line of the reproducer output and so ensuring against singing due to acoustic feedback.

The invention will be fully apprehended from the following detailed description of illustrative embodiments thereof taken in connection with the appended drawings, in which.

Figure 1:
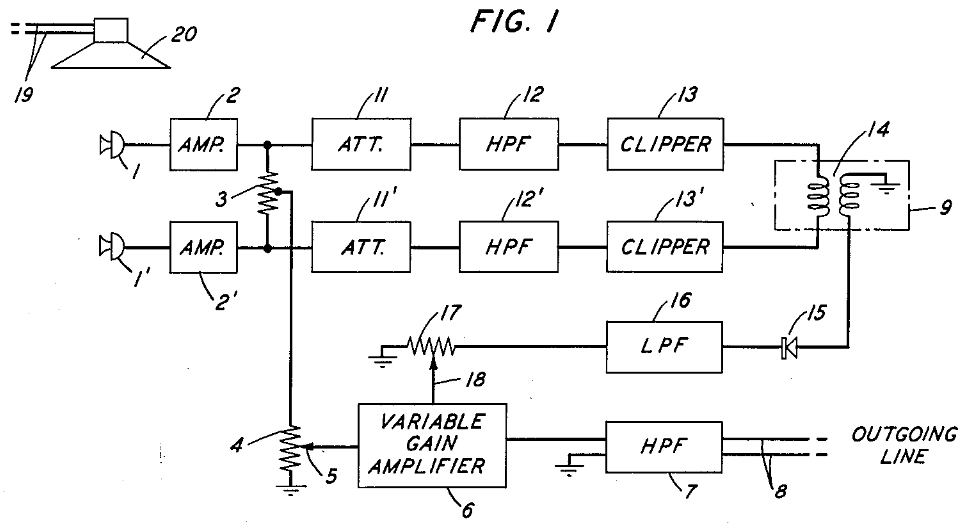
Fig. 1 is a schematic diagram showing a preferred form of apparatus in accordance with the invention.

Referring now to the drawings, Fig. 1 shows a pair of microphones 1, 1′ which may be of any desired variety, for example, ordinary pressure microphones. The output of each microphone is brought to a suitable level by a preamplifier 2, 2′ and the output terminals of these preamplifiers are connected by way of a center-tapped resistor 3 and a resistor 4 having a movable tap 5 to ground. With this arrangement the signal appearing in the variable resistor 4 is proportional to the sum or average of the outputs of the two microphones 1, 1′. A suitable fraction of this signal, determined by the location of the movable tap 5, is transmitted by way of a variable gain amplifier 6 and a high pass filter 7 to a telephone line 8 or other transmission medium.

In addition the output of each microphone is passed to a mixer circuit 9 which derives a signal proportional to the difference between these microphone outputs. For reasons to be explained hereinafter, there are preferably included in tandem with the output of each microphone and ahead of the mixer 9, an attenuator 11, 11′, a high pass filter 12, 12′ and a clipper 13, 13′.

The mixer itself may be of any desired variety, a two-winding transformer 14 as indicated being suitable.

The difference signal derived by the mixer is rectified by a rectifier 15 and passed through a low pass filter 16 which removes high frequency fluctuations and, by way of a senstivity-adjusting resistor 17, to the gain control terminal 18 of the variable gain amplifier.

Figure 4:
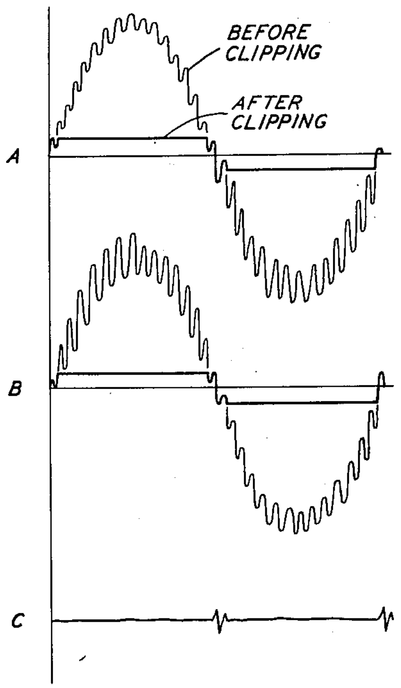
Figs. 4 and 5 are explanatory diagrams illustrating the mode of the operation of the invention.

In Fig. 4 the curve A represents a brief portion of the output of one microphone under the conditions in which the desired speech reaches the microphones along the axis while a disturbing noise reaches them with some other angle of incidence. The noise being of lower amplitude than the desired signal, it is represented as small fluctuations in the amplitude of the larger voice wave. Similarly the curve B shows the ouput of the other microphone under the same conditions. The clipper is adjusted to deliver an output signal of constant amplitude for input signals of all amplitudes above a threshold value as indicated in the figures. By comparing curve A with curve B it will be observed that the clipped outputs applied to the mixer are almost exactly alike despite the fact that the phases of the noise components of the two signals in the two microphones are randomly related. Thus when one is subtracted from the other, the resulting signal is as shown in the curve C. It is zero except during the brief instants at which the voice signal is less than the clipping threshold.

Figure 5:
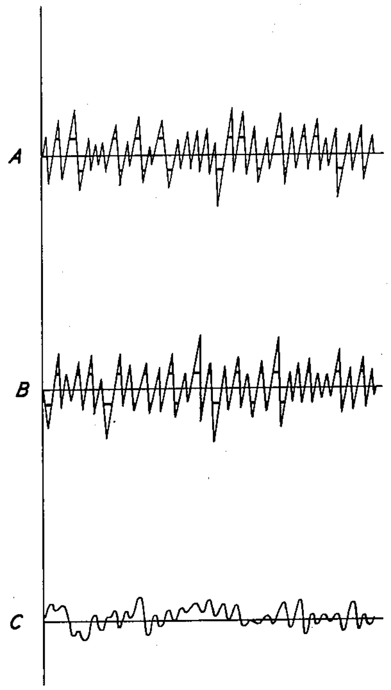

Fig. 5 shows the situation which arises when the on-axis sound ceases, e. g., when the speaker stops talking. The interrupting noise, however, persists and may even be accentuated by room reverberations due to the speaker's last words. The phases of the noise effects are randomly related and since they are no longer masked by coordinated speech waves as in Fig. 4 the clipping action takes place as indicated in curves A and B of Fig. 5 and gives rise to a substantial difference signal, curve C. The latter is now rectified to make it suitable for actuation of the gain control element of the variable gain amplifier 6 and residual high frequency components are removed by the low pass filter 16. The latter is preferably proportioned to have a cut-off frequency of about two cycles per second. This makes the gain control operation take place so sluggishly as not to produce an appreciable variation of the gain in the transmission path from syllable to syllable of the desired speech and yet to reduce the transmission path gain as far as may be desired during pauses.

Figure 6:
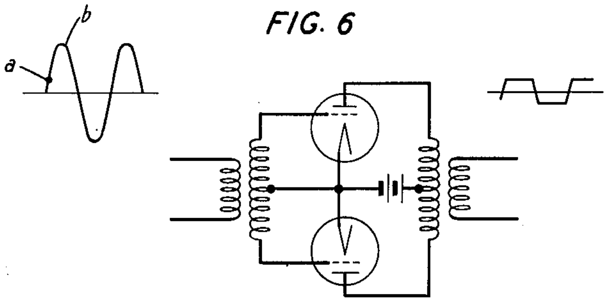
Fig. 6 is a schematic circuit diagram showing one form of clipper which may be employed in carrying out the invention.

The clipper 13 may comprise a pair of high-$\mu$ triodes coupled together in push-pull as shown in Fig. 6 with their control grids biased to cut off. With this arrangement saturation plate current flows for a fairly small input voltage $a$, and increase in the input voltage above this value produces no corresponding change in output current. The attenuator 11 is included merely to adjust the microphone amplifier output to a level suitable for application to the clipper 13. The filter 12 is proportioned to pass frequencies of 150 cycles per second or so and higher but block lower frequencies. If thus prevents the system from acting on the occurrence of a transient noise such as the closing of a door.

Figure 3:
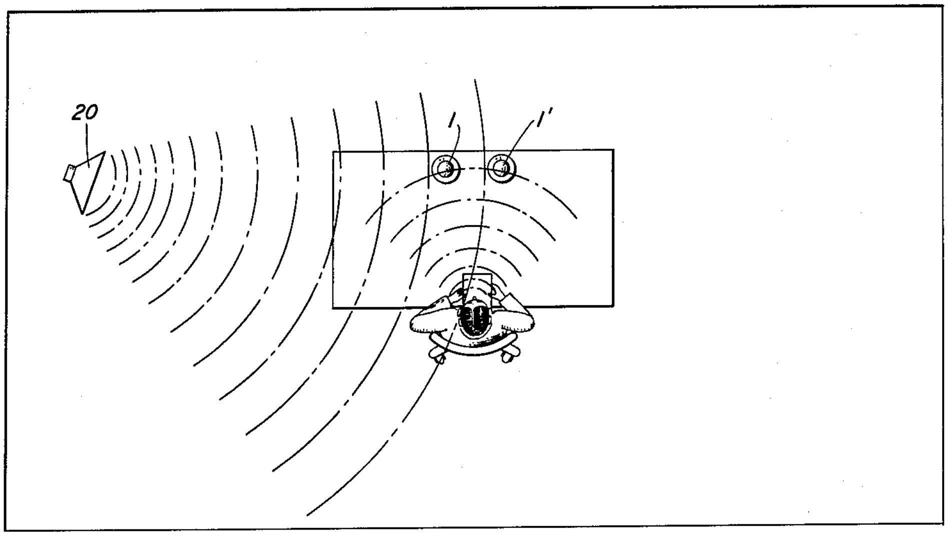
Fig. 3 is a drawing showing the preferred geometrical disposition of the apparatus of the invention.

Incoming voice signals, arriving over a line 19, may be converted into sound waves by a reproducer 20 of any desired variety. As shown in Fig. 3 this reproducer may be located at a convenient distance from the user's ear, for example to one side of his desk and squarely facing him. In accordance with the invention it is in addition preferably located on an extension of the line joining the two microphones. With this disposition, sound waves originating at the reproducer 20 reach the microphones 1, 1' with an angle of incidence such as to produce a maximum difference signal in the mixer 19 and therefore to reduce the gain of the variable gain amplifier 6 to a maximum extent, thus eliminating all possibility of singing due to acoustic feedback. The arrangement does not, however, in any way prevent the user from interrupting the incoming conversation, for as soon as he wishes to do so, he may raise his voice to a level exceeding the level of the reproduced sound, in which case the microphone outputs are principally due to his voice which now takes control in the fashion shown in Fig. 4, where the variations in the amplitude of the symmetrical sound waves are now to be regarded as being due to the sound generated by the reproducer 20.

Figure 2:
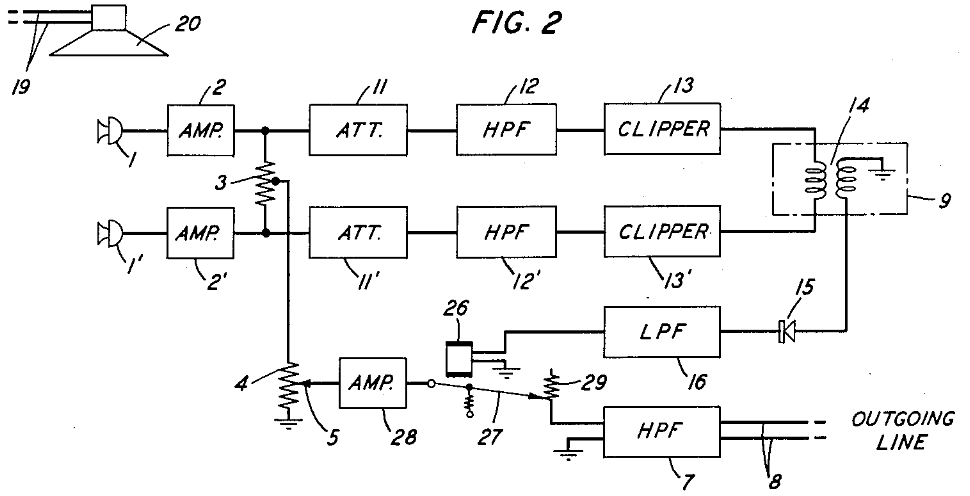
Fig. 2 is a schematic diagram of apparatus alternative to that of Fig. 1.

No great smoothness of operation or precision is required of the variable gain amplifier 6, since for the most part it operates either in a condition of full gain or in a condition of zero gain. In other words, its performance does not differ greatly from that of a switch, and Fig. 2 shows an alternative to Fig. 1 in which the control signal derived from the mixer merely actuates a relay 26 which opens and closes a switch 27 in series with an amplifier 28 and with the main voice transmission path to establish or disestablish it according as the on-axis sound level exceeds the off-axis sound level or vice versa. To avoid annoying clicks the action of the switch may be softened by the interposition of a click-reducer, for example a relay-operated variable resistor 29. However, the arrangement of Fig. 1 is preferred, partly because of the convenience which it affords for adjustment of the gain swing between a desired upper value and a desired lower value. These adjustments may be made by way of a resistor 17 having a movable tap to which the gain control electrode 18 of the amplifier 6 is connected, or in any other desired manner, in a fashion to suit the apparatus to the reverberation conditions and noise conditions in the room in which it is to be employed and to suit the taste of the user.

Under some circumstances it is of primary importance to recognize and record or register the presence of a sound arriving from a particular direction while the actual reproduction or interpretation of this sound may be of much less importance. Such considerations hold, for example, in the design of alarm systems intended to register the presence of a law-breaker. Under such circumstances the ambient noise may be so great as virtually to render the axial sound unintelligible, while the axial sound may still combine with the ambient noise somewhat as indicated in Fig. 4. Thus the axial sound, while it may be of a level too small for intelligibility, may nevertheless be sufficient to enable the clipper and mixer circuits of the invention to deliver a signal of substantially zero value. On the other hand, where the axial sound is entirely absent and only the ambient sounds are present, the situation depicted in Fig. 5 obtains and the control signal delivered by the mixer circuit rises to a substantial value. Thus the presence of the axial sound may be indicated by the transmission over the telephone line or other medium of all the sounds present, and in particular of the ambient noises, while the absence of the axial sound is indicated by the depression of the gain of the amplifier 6 and therefore attenuation of the transmission of all sounds present.

In such a situation the operation of the variable gain amplifier 6 may evidently be reversed, i. e., the presence of a difference signal may raise the gain while its absence depresses the gain. With this arrangement the presence of an axial sound is indicated by attenuation of the transmission of the ambient noises, and vice vera.

What is claimed is:

1. In a distant-talking two-way telephone system, the combination which comprises two like electrocoustic transducers arranged side by side on a base line and disposed to be energized by a sound source located substantially on the perpendicular bisector of said base line, means for additively combining the outputs of said transducers, means including a variable-gain amplifier for transmitting said additively combined outputs as an outgoing telephone signal, means for individually clipping the outputs of said transducers, means for subtractively combining the outputs of said transducers as clipped to provide a control signal, and means for depressing the gain of said amplifier by said control signal, whereby signals originating at said sound source are transmitted without attenuation while signals originating off said perpendicular bisector are attenuated.

2. In combination with apparatus as defined in claim 1, means for individually filtering the outputs of said transducers, prior to clipping them, to remove from said outputs components whose frequencies are below the voice frequency range.

3. In combination with apparatus as defined in claim 1, means for filtering said control signal to remove therefrom components of syllabic and higher frequencies.

4. In a distant-talking two-way telephone system, the combination which comprises two like microphones arranged side by side on a base line and disposed to be energized by the voice of a subscriber stationed substantially on the perpendicular bisector of said base line, means for additively combining the outputs of said microphones, means including a variable gain amplifier for transmitting said additively combined outputs as an outgoing telephone signal, means for subtractively combining the outputs of said microphones to provide a control signal, means for depressing the gain of said amplifier by said control signal, and means for converting an incoming telephone signal into sound waves, said means being located on an extension of said base line, whereby voice sounds of said subscriber are transmitted without attenuation while sounds originating off said perpendicular bisector, including the sound output of said converting means, are attenuated.

5. In a distant-talking two-way telephone system, the combination which comprises three electroacoustic transducers disposed on a substantially straight line and so oriented that their axes intersect each other substantially at a point lying off said straight line, two of said transducers being microphones and the third being a sound reproducer, means for applying incoming telephone signals to said reproducer, means for additively combining the outputs of said microphones, means including a variable gain amplifier for transmitting said additively combined outputs as an outgoing telephone signal, means for subtractively combining the outputs of said microphones to provide a control signal, and means for depressing the gain of said amplifier by said control signal, whereby sounds originating at said intersection point are transmitted as outgoing telephone signals without attenuation while microphone signals due to sounds originating at said reproducer are attenuated.

6. In combination with apparatus as defined in claim 5, means for individually clipping the outputs of said microphones prior to said subtractive combination thereof.

References Cited in the file of this patent

UNITED STATES PATENTS

| | | |
|---|---|---|
| 2,336,880 | Mitchell | Dec. 14, 1943 |
| 2,516,776 | Johnson | July 25, 1950 |
| 2,535,681 | Johnson | Dec. 26, 1950 |
| 2,632,101 | Quarles | Mar. 17, 1953 |